(12) United States Patent
Burma

(10) Patent No.: US 11,918,162 B2
(45) Date of Patent: Mar. 5, 2024

(54) RETROFIT BOX SYSTEM FOR CLEANING INACCESSIBLE FLOORS

(71) Applicant: Bristola, LLC, Waukee, IA (US)

(72) Inventor: Jared Burma, Waukee, IA (US)

(73) Assignee: Bristola, LLC, Waukee, IA (US)

(*) Notice: Subject to any disclaimer, the term of this patent is extended or adjusted under 35 U.S.C. 154(b) by 0 days.

(21) Appl. No.: 17/982,656

(22) Filed: Nov. 8, 2022

(65) Prior Publication Data

US 2023/0055087 A1 Feb. 23, 2023

Related U.S. Application Data

(63) Continuation of application No. 16/868,140, filed on May 6, 2020, now Pat. No. 11,534,045.

(60) Provisional application No. 62/843,897, filed on May 6, 2019.

(51) Int. Cl.
*A47L 11/40* (2006.01)
*B01D 21/00* (2006.01)
*B08B 9/08* (2006.01)

(52) U.S. Cl.
CPC ....... *A47L 11/4011* (2013.01); *A47L 11/4013* (2013.01); *A47L 11/4063* (2013.01); *B01D 21/0006* (2013.01); *B08B 9/08* (2013.01); *A47L 11/4036* (2013.01)

(58) Field of Classification Search
CPC .............. A47L 11/4011; A47L 11/4013; A47L 11/4036; A47L 11/4063; B01D 21/04; B01D 21/24; B01D 21/245; B01D 21/2433; B01D 21/0006; B01D 21/2438; B08B 9/08; B08B 9/0856
See application file for complete search history.

(56) References Cited

U.S. PATENT DOCUMENTS

| | | | |
|---|---|---|---|
| 5,093,949 A | 3/1992 | Sloan | |
| 5,642,745 A | 7/1997 | Landry et al. | |
| 6,189,549 B1 * | 2/2001 | Fontana | B01D 17/0214 210/801 |
| 7,615,155 B1 | 11/2009 | Hansen et al. | |
| 2009/0071510 A1 * | 3/2009 | Hancock | B08B 9/08 134/115 R |

FOREIGN PATENT DOCUMENTS

DE 10 2004 013 304 A1 * 9/2005
KR 10-0365304 * 12/2002

* cited by examiner

*Primary Examiner* — Randall E Chin
(74) *Attorney, Agent, or Firm* — BrownWinick Law Firm; Christopher A. Proskey

(57) ABSTRACT

Retrofit box systems to maximize operational capacity of inaccessible floors are described. The retrofit box system includes a gate complex that provides fluid communication between an inaccessible floor and a box, and a box to deliver a cleaner to the inaccessible floor and adapted for equalizing pressure when the inaccessible floor is under water while minimizing waste seepage from the retrofit box system. The retrofit box system further includes a power system and a control system to deliver the cleaner to the inaccessible floor and remove waste from the inaccessible floor and the box.

19 Claims, 11 Drawing Sheets

RETROFIT BOX SYSTEM FOR CLEANING INACCESSIBLE FLOORS

CROSS REFERENCE TO RELATED APPLICATIONS

This application is a continuation of U.S. patent application Ser. No. 16/868,140 which was filed on May 6, 2020, now U.S. Pat. No. 11,534,045, entitled "RETROFIT BOX SYSTEM FOR CLEANING INACCESSIBLE FLOORS, which claims the benefit of U.S. Provisional Application No. 62/843,897 which was filed on May 6, 2019, entitled "RETROFIT BOX SYSTEM FOR CLEANING INACCESSIBLE FLOORS", which are hereby incorporated by reference herein in their entireties.

OVERVIEW OF THE DISCLOSURE

Removal of waste material from floors that are inaccessible during operation (inaccessible floors) conventionally requires halting operations to remove the waste material. For example, a floor may be inaccessible due to coverage with liquid, such as the floor of an anaerobic digester tank or anaerobic lagoon.

For optimal performance waste accumulation on the inaccessible floor must be removed. Waste accumulates on an inaccessible floor under normal operating conditions. For example, with respect to inaccessible floors of anaerobic digester tanks or lagoons, the process of anaerobic digestion produces waste. During anaerobic digestion microorganisms (e.g. acetogenic bacteria, archaea) breakdown organic matter into biogas (e.g. methane, carbon dioxide) and solid and liquid digested material (e.g. waste) having elemental nutrients, such as nitrogen, phosphorus, and potassium. Biogas is used as a fuel for combustion and energy production. The waste may be further processed for other uses (e.g. fertilizer), may be recycled back into the digester, or may be discarded.

As anaerobic digestion is carried out in the closed system of an anaerobic digester tank or lagoon that is sealed from the presence of oxygen, the anaerobic digester tank or lagoon fills with waste. This leads to reduced volume for anaerobic digestion to take place, with volume for anaerobic digestion reducing continuously as anaerobic digestion continues. Eventually digester tanks and lagoons require cleaning to remove the waste to maximize volume for anaerobic digestion to take place and to maintain the health of the microorganisms carrying out anaerobic digestion.

Conventional methods for cleaning anaerobic digester tanks and lagoons typically require manual cleaning, whereby production is first shut down, and the anaerobic tank or lagoon is vented and drained. After venting and draining, manual cleaning requires that a human enter the tank or lagoon to assist raking digested contents toward a vacuum where they can be removed. This manual process is both time consuming and hazardous.

The manual process of cleaning a digester tank on average takes at least two weeks, with additional time required to re-seed the tank with microorganisms to restart anaerobic digestion. Not only does production cease all together during this cleaning period, but because cleaning requires shutting down the entire digester operation, digester tanks tend to be cleaned less frequently. Less frequent cleaning means that a digester tank operates at sub-optimal volume.

The manual process of cleaning a digester tank is hazardous for humans. Venting the tank requires releasing explosive and hazardous gasses that may be poisonous to humans (sulfuric acid and ammonia). Moreover, it is dangerous to put a human in a digester tank, as they encounter hazards in a confined space handling mechanical equipment.

It is therefore desirable for a system to provide access to inaccessible floors for cleaning without requiring shutting down operations to increase operational production. It is further desirable that the system may be retrofitted to an existing inaccessible floor to allow cleaning without discharging liquid from the inaccessible floor. Finally, it is desirable to not require physical human entry onto the inaccessible floor during cleaning to reduce the risk of injury and death and to minimize manual expenditure of labor.

SUMMARY OF THE DISCLOSURE

Figure 1:
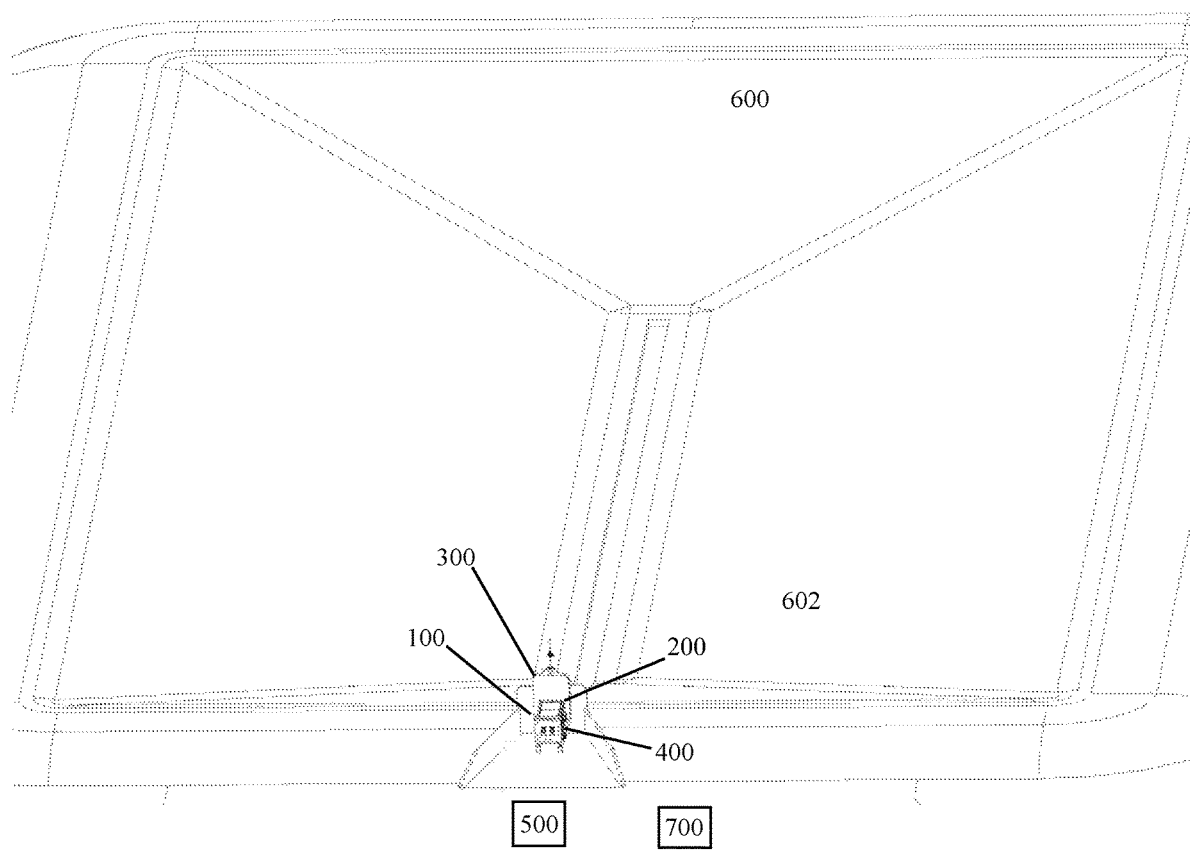
FIG. 1 is a perspective view of a retrofit box system in connection with an inaccessible floor system.

In aspects of the invention a box of the retrofit box system for delivering a cleaner to an inaccessible floor, the box including a deployment chamber having a deployment chamber interior volume; at least one wash chamber adjacent to the deployment chamber, the at least one wash chamber having at least one wash chamber interior volume and at least one wash chamber aperture, wherein the deployment chamber interior volume in in fluid communication with the at least one wash chamber interior volume via the at least one wash chamber aperture; a lid removably attached to a top of the box configured to seal the box; two or more legs in mechanical communication with a bottom of the box; and a waste discharge pipe in mechanical communication with an exterior of the box and in fluid communication with the deployment chamber interior volume and the at least one wash chamber interior volume, and one or more apertures formed from the at least one wash chamber, opposite to the at least one wash chamber aperture.

Another aspect includes the box, wherein the at least one wash chamber having a floor sloped downward to the waste discharge pipe.

Another aspect includes the box, wherein the lid having two or more separate pieces, wherein a first piece is removably attached to a top of the deployment chamber, and a second piece is removably attached to a top of the at least one wash chamber.

In other aspects of the invention, a retrofit box system for minimizing waste seepage from the inaccessible floor system during cleaning of an inaccessible floor, the retrofit box system including a box, the box comprising, a deployment chamber having a deployment chamber interior volume configured to deploy a cleaner to an inaccessible floor; at least one wash chamber adjacent to the deployment chamber distal to the inaccessible floor, the at least one wash chamber having at least one wash chamber interior volume and at least one wash chamber aperture, wherein the deployment chamber interior volume in in fluid communication with the at least one wash chamber interior volume via the at least one wash chamber aperture; a lid removably attached to a top of the box configured to seal the box; two or more legs in mechanical communication with a bottom of the box; and a waste discharge pipe in mechanical communication with an exterior of the box and in fluid communication with the deployment chamber interior volume and the at least one wash chamber interior volume, and one or more apertures formed from the at least one wash chamber opposite to the at least one wash chamber aperture providing access to the exterior of the box; the cleaner configured to remove waste from the inaccessible floor; a gate complex separating the deployment chamber of the box from the inaccessible floor, the gate complex comprising a gate; and a gate controller to move the gate complex to an open position and a closed position, wherein in the open position the gate complex provides fluid communication between the deployment chamber and the inaccessible floor and the cleaner with access to the inaccessible floor from the deployment chamber of the box, and in the closed position the gate complex hinders fluid communication between the deployment chamber and the inaccessible floor.

Other aspects include, the retrofit box system, wherein the cleaner comprises a drive configured to provide motive action for the cleaner, an auger configured to disturb waste on the inaccessible floor, a slurry pump configured to pump waste from the inaccessible floor to waste discharge lines, and the waste discharge lines received by the at least one wash chamber aperture and the one or more apertures, wherein the waste discharge lines are in mechanical communication with the slurry pump.

In other aspects, the retrofit box system, further includes a power system configured to power the cleaner and to pump waste from the retrofit box system, the power system comprising a cleaner circuit configured to power the drive, the auger, and the slurry pump of the cleaner, wherein the cleaner circuit is in hydraulic and electric communication with the cleaner via power lines, a pump circuit configured to pump waste from the waste discharge lines to a disposal device, wherein the pump circuit is in fluid communication with the slurry pump and the disposal device via the waste discharge lines, a box circuit to remove waste from the box, wherein the box circuit is in fluid communication with the waste discharge pipe.

Other aspects include, the retrofit box system of claim 6, wherein the disposal device is a semi-truck having a liquid carrying container.

In other aspects of the invention, the retrofit box system further includes a control system configured to wirelessly control the cleaner circuit of the power system and to control the cleaner.

Other aspects include the retrofit box system, wherein the at least one wash chamber aperture and the one or more apertures provide the power lines access to the cleaner.

Other aspects include the retrofit box system, wherein the at least one wash chamber further comprises a track roller system to facilitate deployment of the power lines and waste discharge lines.

In other aspects of the invention, a box of a retrofit box system for delivering a cleaner to an inaccessible floor, the box comprising a deployment chamber having a deployment chamber interior volume; a first wash chamber adjacent to the deployment chamber, the first wash chamber having a first wash chamber interior volume and a first wash chamber aperture, wherein the deployment chamber interior volume is in fluid communication with the first wash chamber interior volume via the first wash chamber aperture; a second wash chamber adjacent to the first wash chamber, the second wash chamber having a second wash chamber interior volume and a second was chamber aperture, wherein, the first wash chamber interior volume is in fluid communication with the second wash chamber interior volume via the second wash chamber aperture; and the first wash chamber aperture is opposite the second wash chamber aperture; a lid removably attached to a top of the box configured to seal the box; two or more legs in mechanical communication with a bottom of the box; and a waste discharge pipe in mechanical communication with an exterior of the box and in fluid communication with the deployment chamber interior volume, the first wash chamber interior volume, and the second wash chamber interior volume, and one or more apertures formed from the second wash chamber, opposite to the second wash chamber aperture.

Other aspects include the box, wherein the deployment chamber is configured to deliver the cleaner to the inaccessible floor system.

Other aspects include the box, wherein the first wash chamber having a floor sloped downward to the waste discharge pipe, and the second wash chamber having a floor sloped downward to the waste discharge pipe.

DETAILED DESCRIPTION

Retrofit box systems to maximize operational capacity of inaccessible floors are described. The retrofit box system includes a gate complex that provides fluid communication between an inaccessible floor and a box, and a box to deliver a cleaner to the inaccessible floor and adapted for equalizing pressure when the inaccessible floor is under water while minimizing waste seepage from the retrofit box system. The retrofit box system further includes a power system and a control system to deliver the cleaner to the inaccessible floor and remove waste from the inaccessible floor and the box. As used herein waste, for example from anaerobic digestion, is considered fluid.

The cleaner is delivered to the inaccessible floor via the at least one gate complex and the power system and control system that provide wireless controlled movement of the cleaner throughout the floor system. Thus, the retrofit box system allows cleaning of the inaccessible floor while the inaccessible floor system is in operation increasing the yield from the inaccessible floor system. Further, the retrofit box system does not require a human to enter the inaccessible floor decreasing risk associated with cleaning.

FIG. 1 is a perspective view of a retrofit box system 100 in connection with an inaccessible floor system 600. The retrofit box system 100 includes a box 200 (see FIGS. 2A and 2B), at least one gate complex 300 (see FIG. 3), a cleaner 400 (see FIG. 4) and a power system 500 (see FIG. 5), and a control system 700 (see FIG. 6). The inaccessible floor system 600 includes an inaccessible floor 602. The inaccessible floor 602 may be may be submerged under liquid, such that the inaccessible floor 602 is inaccessible during use. For example, the inaccessible floor system 600 may be an anaerobic digester tank or an anaerobic lagoon.

The box 200 of the retrofit box system 100 is in fluid communication with the inaccessible floor 602 via the gate complex 300 and allows delivery of the cleaner 400 to the inaccessible floor 602. The box 200 having a box interior volume (i.e. a deployment chamber interior volume and at least one wash chamber interior volume(s)) may further equalize liquid pressure between the box 200 and the inaccessible floor system 600 for delivery of the cleaner 400 to the inaccessible floor 602 while minimizing seepage from the retrofit box system 100. The box 200 is from 4.57 to 9.14 meters (15 to 30 feet) in length, 0.91 to 2.13 meters (3 to 7) feet in width, and 0.91 to 2.13 meters (3 to 7 feet) in height. The box 200 may be made of a non-corrosive material such as stainless steel, metal alloys, or the like.

Figure 2A:
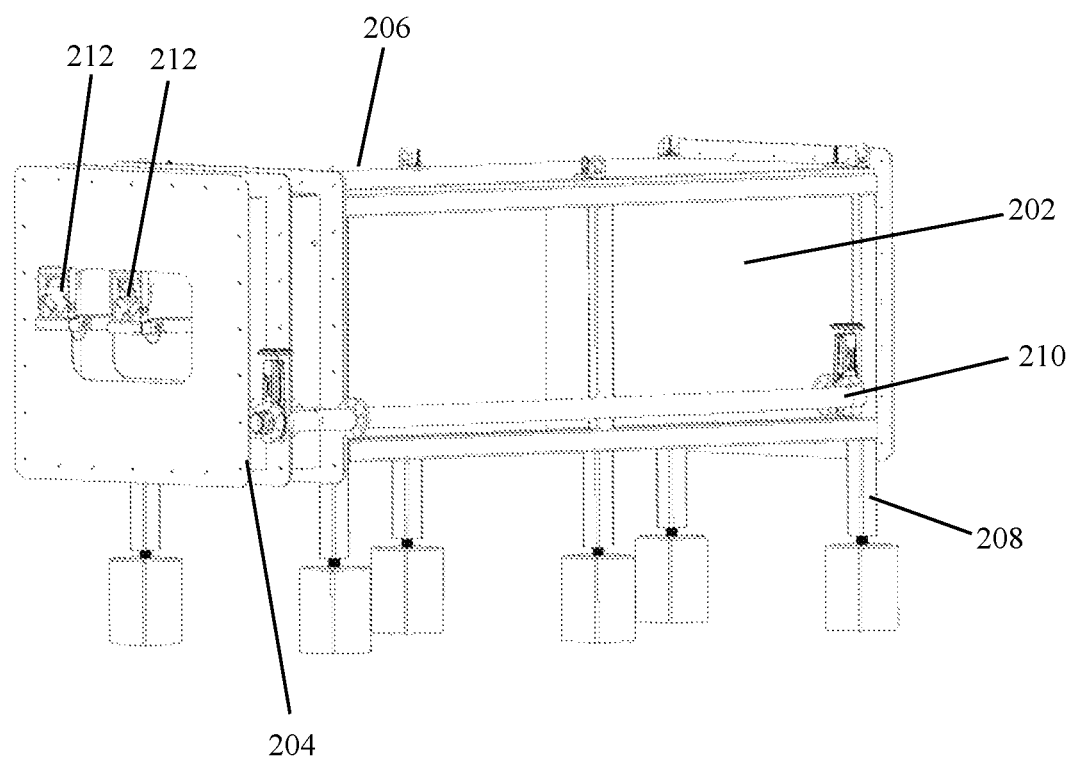
FIG. 2A is a side view of a box of the retrofit box system.

FIG. 2A represents a side view of the box 200 of the retrofit box system 100. The box 200 includes a deployment chamber 202, at least one wash chamber 204, a lid 206, two or more legs 208, a waste discharge pipe 210, and one or more apertures 212. The deployment chamber 202 of the box 200 having a deployment chamber interior volume is in fluid communication with the inaccessible floor 602 via the gate complex 300. The deployment chamber 202 is configured to hold, deploy, and receive the cleaner 400.

Figure 2B:
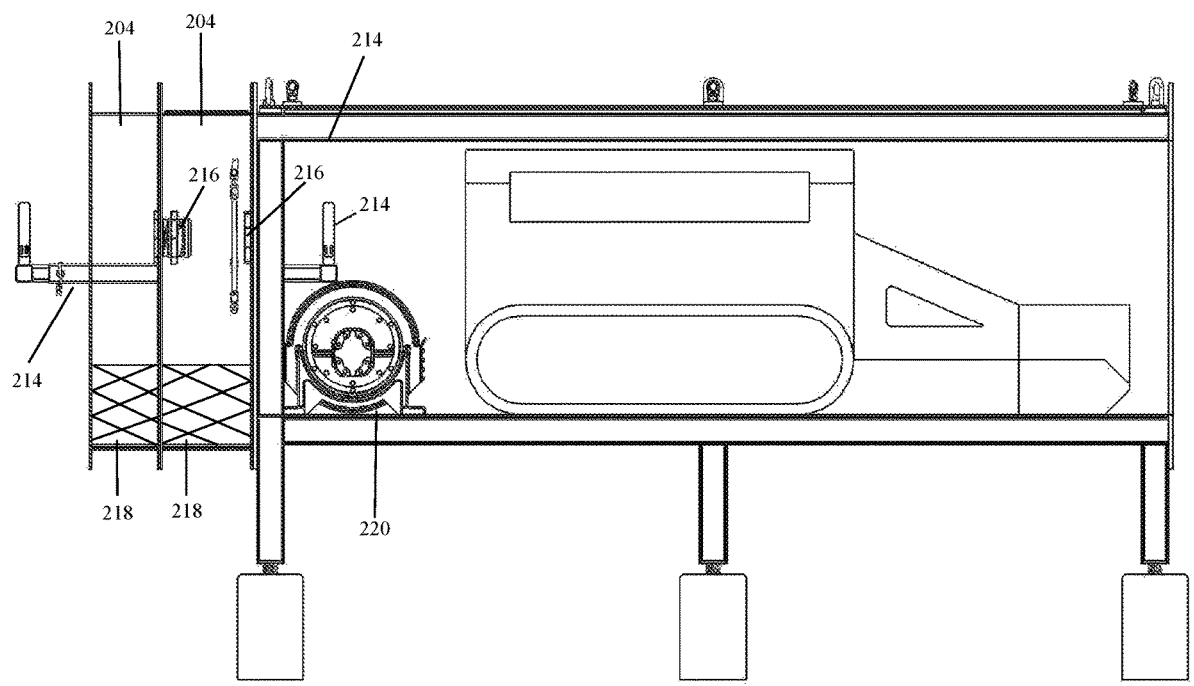
FIG. 2B is a transparent perspective view of the retrofit box system.

The at least one wash chamber 204 is configured to receive seepage of waste from the deployment chamber 202 during cleaning of the inaccessible floor system 600 as pressure between the box 200 and inaccessible floor system 600 maintains equilibrium, while minimizing seepage from the retrofit box system 100 during cleaning. The at least one wash chamber is adjacent to the deployment chamber distal to the inaccessible floor 602. The at least one wash chamber 204 having at least one wash chamber interior volume is in fluid communication with the deployment chamber interior volume of the deployment chamber 202 as shown in FIG. 2B As the deployment chamber interior volume fills with waste, waste will move into the at least one wash chamber interior volume via one or more wash chamber apertures 216 (see FIG. 2B), providing equilibrium between the box 200 and the inaccessible floor system 600. Preferably, there are two or more wash chambers 204, where each wash chamber 204 is adjacent to the next wash chamber. For example, in the event that the wash chamber 204 directly adjacent to the deployment chamber 202 fills with waste, the next directly adjacent wash chamber 204 will begin to receive waste to maintain the equilibrium between the box 200 and the inaccessible floor system. The at least one wash chamber 204 is from 15.24 to 45.72 centimeters (6 to 18) inches in length, and is substantially the same height and width as the deployment chamber.

The lid 206 of the box 200 seals the at least one box 200 during use of the cleaner 400. The box 200 allows liquid to enter the box interior volume of the deployment chamber 202 to equalize fluid pressure of the retrofit box system 200 with the inaccessible floor system 600, where the liquid remains in the retrofit box system 200 during cleaning as the lid 206 seals the box 200. The lid 206 is substantially the same length and width as the box 200. The lid 206 is removably attached to a top the box 200 to seal the box 200, such as through bolts, screws, or combinations thereof. The lid 206 may be made of a non-corrosive material such as stainless steel, metal alloys, or the like. The lid 206 may be apportioned into separate pieces to cover the deployment chamber 202 and the at least one wash chamber 204, for respective removable attachment.

The two or more legs 208 of the box 200 are configured to place the box 200 at a height where the cleaner 400 may be deployed to the inaccessible floor 602 of the inaccessible floor system 600. The two or more legs 208 are in mechanical communication with a bottom of the box 200, such as through welding, bolts, rivets, or the like. The two or more legs 208 may be of any non-corrosive material, such as stainless steel, metal alloys, or the like. The two or more legs 208 may include concrete fittings at their bottoms to increase stability of the two or more legs 208.

The waste discharge pipe 210 of the box 200 is configured for removal of waste from the deployment chamber 202 and the at least one wash chamber 204 of the box 200 after cleaning of the inaccessible floor system 600. The waste discharge pipe 210 is in mechanical communication with the exterior of the box 200, and provides fluid communication with the box interior volume (deployment chamber interior volume and at least one wash chamber interior volume) at the deployment chamber 202 and the at least one wash chamber 204, such as via one or more waste apertures. The waste discharge pipe 210 may be of any non-corrosive material, such as stainless steel, metal alloys, or the like.

The one or more apertures 212 are configured to accommodate power lines 510 and waste discharge lines 408 for connection to the cleaner 400. The one or more apertures 212 are formed from the at least one wash chamber 204 most distal to the inaccessible floor 602.

FIG. 2B is a transparent perspective view of the box 200 of the retrofit box system 100. As shown in FIG. 2B the at least one wash chamber includes a sloped floor 218 configured to move waste toward the waste discharge pipe 210 (not shown). The at least one wash chamber 204 includes at least one wash chamber aperture 216 configured to allow connection of the power lines 510 and the waste discharge lines 408 to the cleaner 400 in the deployment chamber 202. The at least one wash chamber aperture 216 further provides fluid communication between the deployment chamber box volume and the at least one wash chamber box volume. The at least wash chamber aperture 216 may include a grommet fitting to reduce wear and tear of the at least one hose of the cleaner 400.

The at least one wash chamber 204 includes a track roller system 214. The track roller system 214 is configured to facilitate deployment of the power lines 510 and the waste discharge lines 408 during cleaning to reduce strain on the at least one wash chamber aperture 216 and at least one aperture 212 (e.g. bushings of the grommets).

The box 200 may further include a winch 220 in the box interior volume configured for retrieving the cleaner 400 from the inaccessible floor 602 when the cleaner 400 becomes stuck during use.

Figure 3:
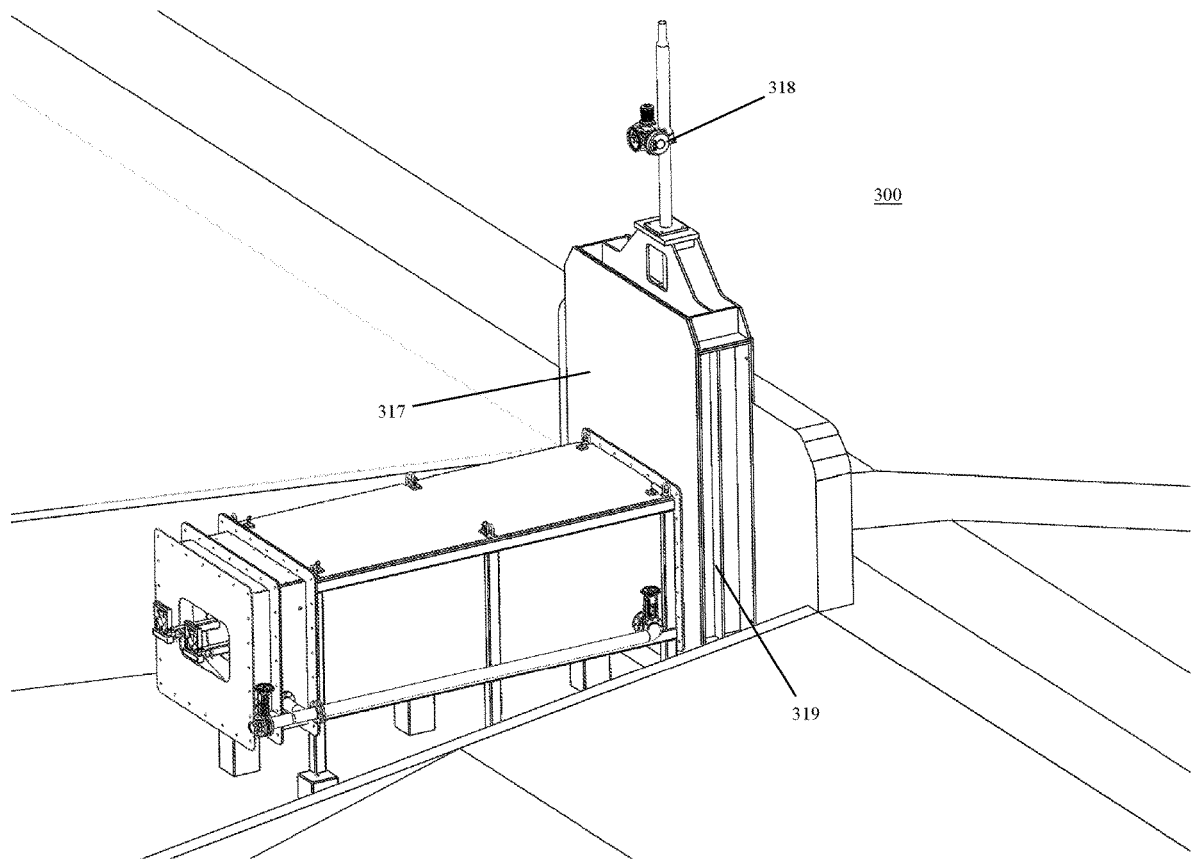
FIG. 3 represents a gate complex of the retrofit box system.

FIG. 3 represents the gate complex. The gate complex 300 of the retrofit box system 100 is configured to provide the cleaner 400 with access to the inaccessible floor 602 of the inaccessible floor system 600. The gate complex 300 separates the deployment chamber 202 of the box 200 from the inaccessible floor 602. The gate complex 300 includes a gate 319, a gate shield 317, and a gate controller 318. The gate 319 of the at least one gate complex 300 separates the inaccessible floor 602 from the deployment chamber 202 of the box 200 hindering fluid communication when in a closed position. When in an open position (as shown), the at least one gate 319 allows fluid communication between inaccessible floor 602 and the interior volume of the deployment chamber of the deployment chamber 202, and provides access to inaccessible floor 602 for the cleaner 400.

The gate controller 318 opens and closes the gate 319, such as via a single cylinder hydraulic drive motor, an electric motor, or a manual hydraulic control. The at least one gate complex 300 may include a gate shield 317 that substantially receives the gate 319 when it is open to protect it from damage. The gate shield prevents seepage from the retrofit box system 100, when the gate 319 is in an open position. The gate shield 317 may be of any non-corrosive material such as stainless steel, metal alloys, or the like.

Figure 4:
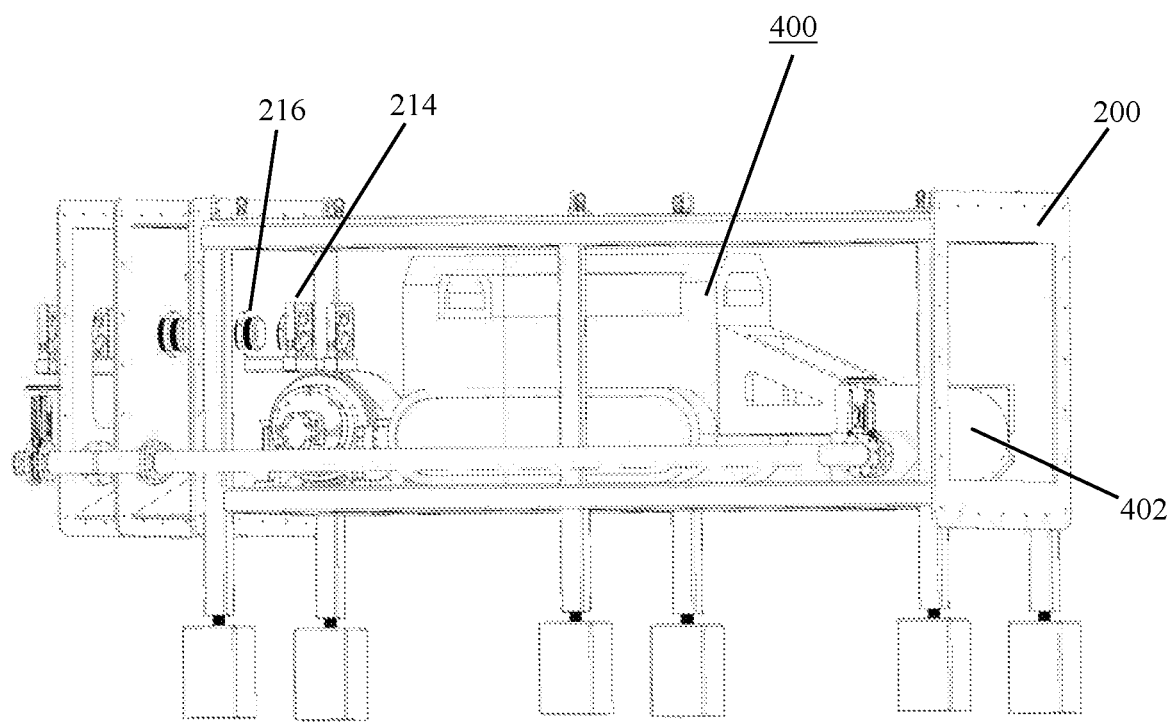
FIG. 4 represents the cleaner of the retrofit box system.

FIG. 4 illustrates the cleaner 400 as received by the box 200. The cleaner 400 is configured to remove waste from the floor 602 of the floor system 600. The cleaner 400 includes a drive 402, an auger 404, a slurry pump 406, and the waste discharge lines 408. The drive 402 is configured for motive actions of the cleaner 400 along the floor 602 of the floor system 600. The auger 404 is configured to disturb waste on the floor 602. The slurry pump 406 is configured to pump waste from the inaccessible floor 602 to the waste discharge lines 408. For example, the cleaner may be a remote operated vehicle, such as a Mud Cat™ ROV model SRD-6E ROV.

The retrofit box system 100 may further include a transfer carriage 410 as represented in FIGS. 7A-7E, the transfer carriage 410 configured to deploy the cleaner 400 from the box 200 through the gate complex 300 to the floor system 600, such as through horizontal and vertical movement of the cleaner 400. The transfer carriage 410 is in removable attachment with the cleaner 400 and mechanical communication with the box 200. The transfer carriage 410 includes a carriage 412, a drive screw motor 414, and a winch 220, transfer tubes 418, guide rods 420 (see FIGS. 7A-7C).

The carriage 412 of the transfer carriage 410 provides horizontal extension of the cleaner 400 in and out of the box 200 through the gate complex 300. The carriage 412 is in removable attachment to the cleaner 400, where the carriage 412 is attached to the cleaner 400 in the box 200 and through the gate complex 300 (see FIG. 7D carriage in retracted position), and the carriage 412 is not attached to the cleaner 400 when the cleaner is lowered to the inaccessible floor 602 for cleaning (see FIG. 7E carriage in extended position).

Further the carriage 412 is in sliding mechanical communication with the guide rods 420 providing for horizontal movement of the carriage 412. The carriage 412 may be an I beam having associated brackets providing the communication described herein. The carriage 412 may include one or more winch cable guides 422 configured to guide a winch cable attached to the cleaner 400 in line with the carriage 412, such that the winch cable extends straight from the winch 220 perpendicular through the gate complex 300 (see FIG. 7E).

The guide rods 420 of the transfer carriage 410 guide the carriage 412 and the attached cleaner 400 into and out of the box 200 through the gate complex 300. The guide rods 420 are in mechanical communication such as through bolts, with a side of the wash chamber 204 of the box 200 closest to the gate complex 300, and on either side of the gate complex 300 (see FIG. 7B, 7C).

The transfer tubes 418 of the transfer carriage 410 are configured for waste removal and electrical connection to the cleaner 400. For example, one of the transfer tubes 418 may be configured for waste removal and is in fluid communication with the waste discharge lines 408 of the cleaner and the waste discharge pipe 210, and the other of the transfer tubes 418 provides electrical connection from the power system 500 to the cleaner 400.

The drive screw motor 414 provides screw type extension of the carriage 412. The drive screw motor 414 may be configured to power the horizontal and vertical extension of the carriage 410. The drive screw motor 414 may be a chain and sprocket electric motor. The drive screw motor 414 is mounted to the inside of the wash chamber 204 of the box 200 on a side farthest from the gate complex 300 (see FIG. 7A). The drive screw motor 414 is in electrical communication with the power system 500. The drive screw motor 414 is of a type that is explosive proof The motor is controlled by the control system 700.

The winch 220 is configured for moving the cleaner 400 horizontally. The winch 220 may be configured to move the cleaner 400 vertically. The cable of the winch 220 extends through the winch cable guide 422. The winch 220 may be configured to move the cleaner 400 upward vertically while the cleaner 400 is in the deployment chamber 202 of the box 200. The carriage 412 then moves the cleaner 400 horizontally from the box 200 through the gate complex 300 to the floor system 600. The winch 220 may then move the cleaner 400 downward vertically until the cleaner 400 contacts the floor system 600 or the waste on the floor system 600.

Figure 5:
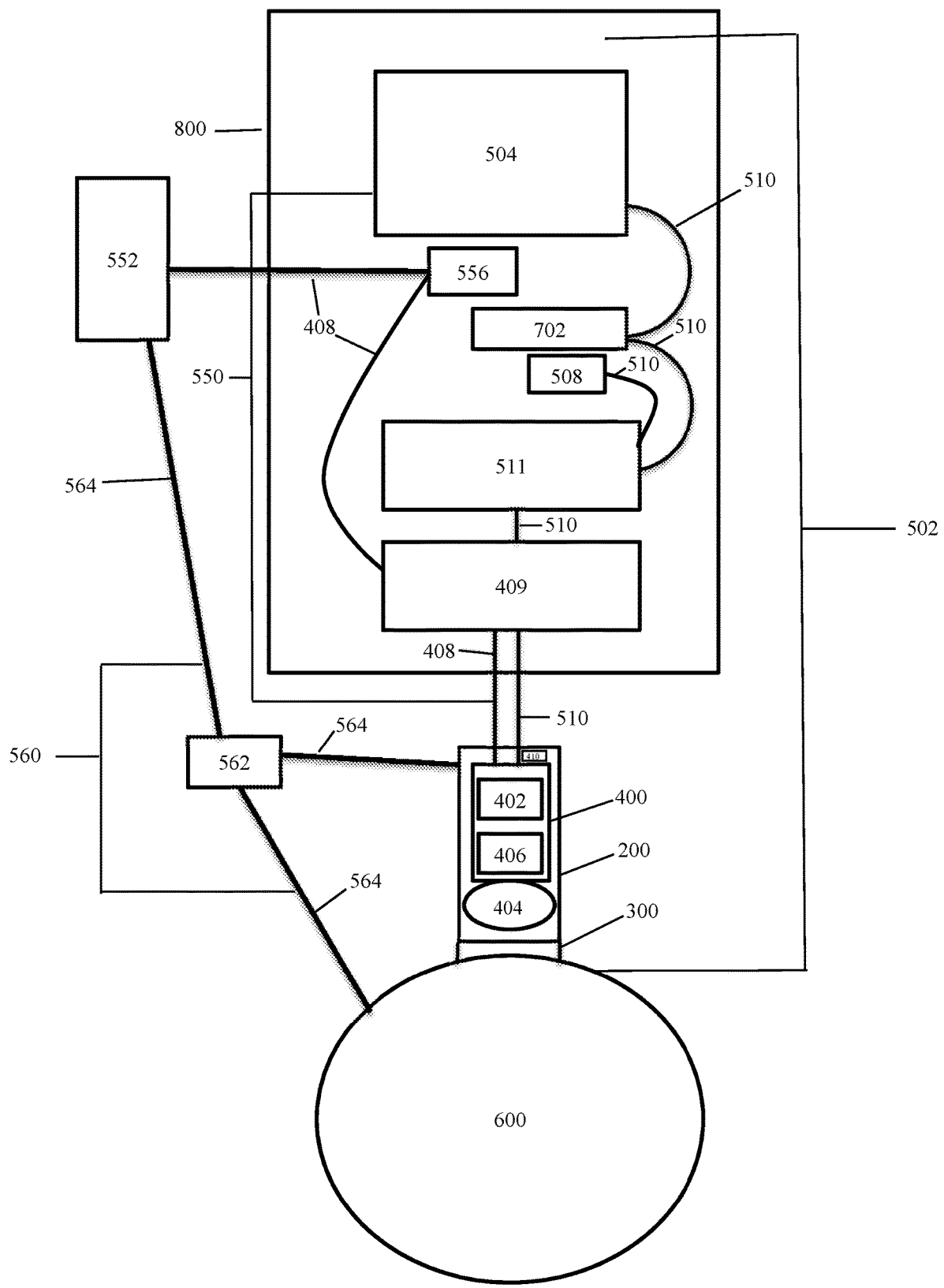
FIG. 5 represents the power system of the retrofit box system.

FIG. 5 illustrates the power system 500 of the retrofit box system 100. The power system 500 is configured to supply power to the cleaner 400 and to pump waste from the retrofit box system 100. The power system 500 may reside on a mobile vehicle, such as a truck or semi (represented by box 800), which may be transported to the box 200. The power system 500 includes a cleaner circuit 502, a pump circuit 550, and a box circuit 560. The cleaner circuit 502 of the power system 500 is configured to power the drive 402, the auger 404, and the slurry pump 406 of the cleaner 400. The cleaner circuit 502 may further be configured to power the winch 220 and the drive screw motor 414 of the transfer carriage 410. The cleaner circuit 502 includes a power source 504, a hydraulic box 508, and power lines 510. The cleaner circuit is in electric and hydraulic communication with the drive 402, the auger 404, and the slurry pump 406 via the power lines 510.

The power source 504 is engaged to generate electric power to supply electric power to the control system 700 (see FIG. 6) and the power lines 510. The power source 504 may be a diesel motor or electric generator. Simultaneously, or nearly simultaneously, the hydraulic box 508 is engaged to supply hydraulic power to the power lines 510. The power lines 510 supply power (hydraulic and electric power) to the drive 402, the auger 404, and the slurry pump 406 of the cleaner 400. The power lines 510 may further supply power to the winch 220 and the drive screw motor 414. The power lines may be transported and dispensed via a power line reel 511.

The pump circuit 550 of the power system 500 is configured to pump waste from the cleaner 400 to a disposal device 552. The pump circuit 550 includes waste discharge lines 408, a pump 556, and the disposal device 552. The waste discharge lines may be transported and dispensed via a waste discharge line reel 409. The pump 556 is in fluid communication with the slurry pump 406 of the cleaner 400 via the waste discharge lines 408. The pump 556 is engaged to pump waste from the waste discharge lines 408 to the disposal device 552. The pump 556 may be powered via a diesel engine, such as a CD103M Dri-Prime® Pump. The disposal device 552 may be a semi with a liquid-carrying container to remove waste to a remote location, or the disposal device 552 may be a dewatering box to refine the waste and supply water back to the floor system 600. The box pump 562 may be a hydraulic pump.

The box circuit 560 of the power system 500 is configured to remove waste from the box 200 upon completion of cleaning. The box circuit 560 includes a box pump 562 and box lines 564. The box pump 562 and box lines 564 are in fluid communication with the waste discharge pipe 210 of the box 200 to remove waste upon completion of cleaning to either the disposal device 552 or the inaccessible floor system 600.

Figure 6:
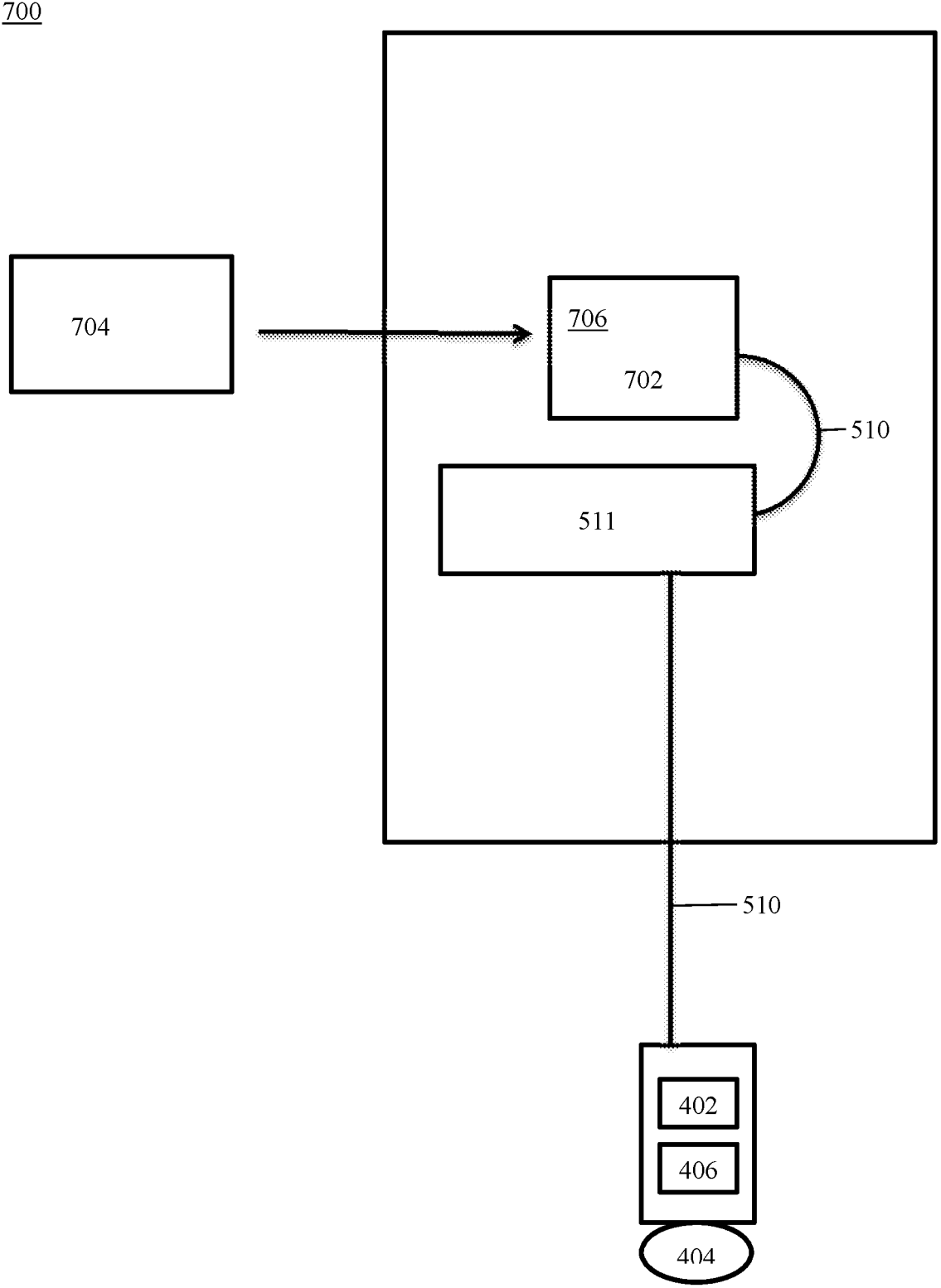
FIG. 6 represents the control system of the retrofit box system.
Figure 7A:
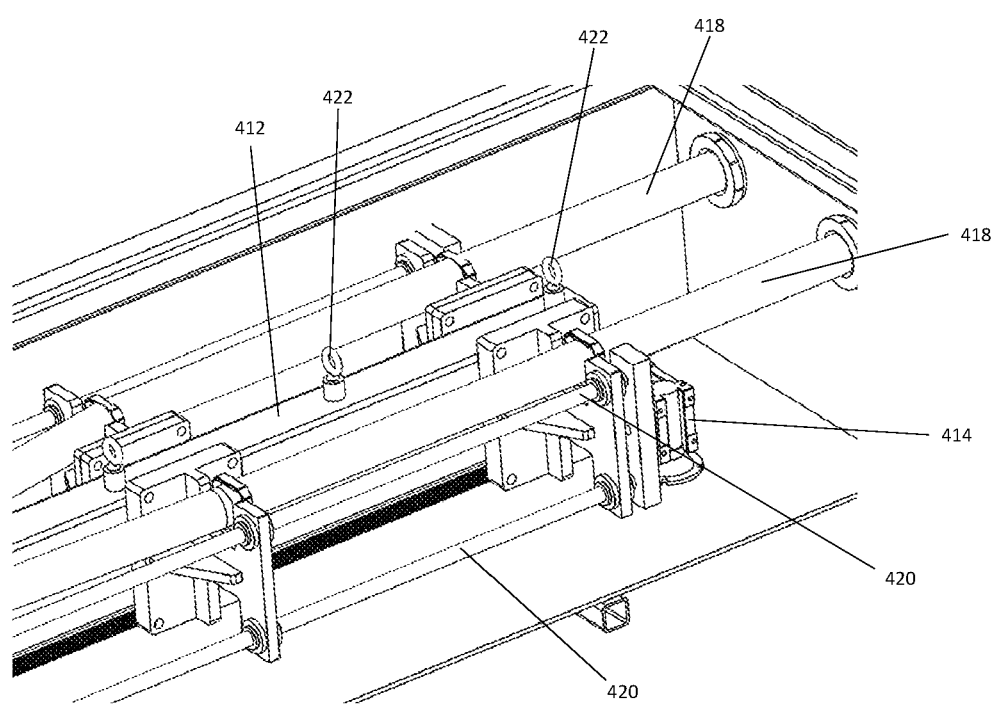
FIG. 7A represents a first perspective view of the transfer carriage of the retrofit box system.
Figure 7B:
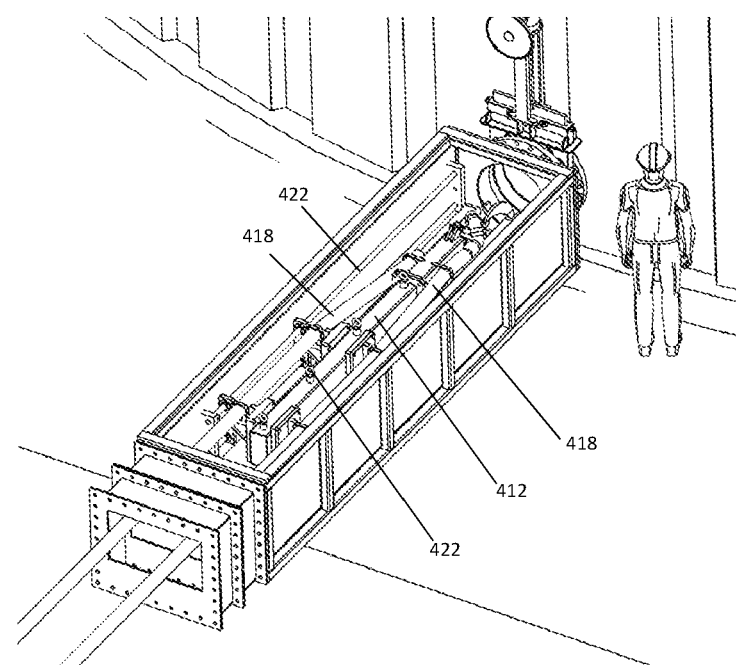
FIG. 7B represents a second perspective view of the transfer carriage of the retrofit box system.
Figure 7C:
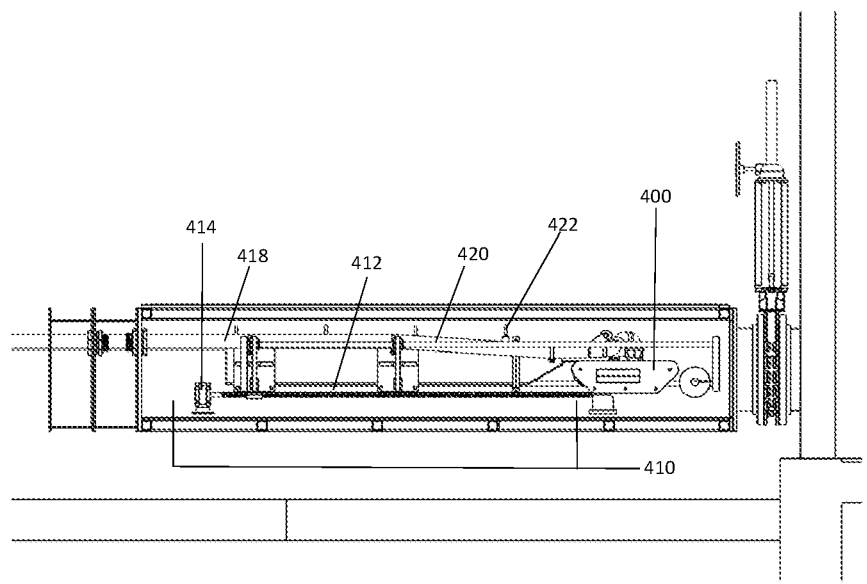
FIG. 7C represents a side view of the transfer carriage of the retrofit box system.
Figure 7D:
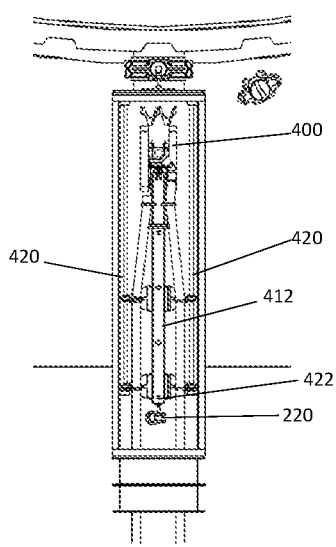
FIG. 7D represents a top view of the transfer carriage with a carriage retracted.
Figure 7E:
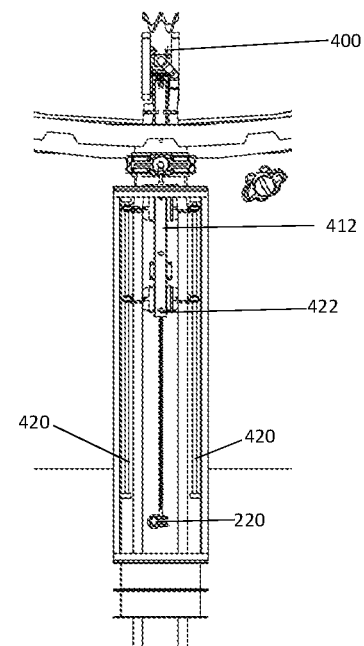
FIG. 7E represents a top view of the transfer carriage with the carriage extended.

FIG. 6 represents the control system 700 of the retrofit box system 100. The control system 700 is configured to control the cleaner circuit 502 of the power system 500 and the cleaner 400. The control system 700 includes a control unit 702 having a signal receiver 706, a wireless controller 704, and the power lines 510. The control system 700 is in electric communication with the power system 500 to receive operating power.

The wireless controller 704 transmits a control signal to the control unit 702. The wireless controller 704 may transmit the control signal from a distance of 152.4 m (500 feet) or less from the control unit 702 allowing operation of the cleaner circuit 502 and the cleaner 400 at a distance safely away from inaccessible floor system 600. The control signal is received by a signal receiver 706 of the control unit 702, where the control unit 702 controls the cleaner circuit 502 and the cleaner 400 to engage the drive 402, the auger 404, and the slurry pump 406 via the power lines 510.

What is claimed:

1. A cleaning system for cleaning a floor of a closed liquid filled system having a volume, the system comprising:
   a gate;
      wherein the gate is configured to allow selective access into the closed system;
   a cleaner;
   a first waste discharge line;
      the first waste discharge line attached to the cleaner;
   a deployment chamber;
      the deployment chamber having at least one aperture;
      the deployment chamber having an interior volume;
      the deployment chamber configured to hold the cleaner within the interior volume of the deployment chamber;
      wherein the deployment chamber is configured to be attached to the closed system;
   a wash chamber;
      the wash chamber having at least one aperture;
      wherein the wash chamber is configured to be attached to the deployment chamber;
   wherein the first waste discharge line is configured to extend through the at least one aperture of the deployment chamber and through the at least one aperture of the wash chamber;
   wherein the deployment chamber is configured to selectively deploy the cleaner into the closed system and onto the floor in order to clean the floor;
   wherein waste removed from the floor by the cleaner is pumped through the first waste discharge line and through the deployment chamber.

2. The cleaning system of claim 1 wherein the deployment chamber is configured to be removably attached to the closed system.

3. The cleaning system of claim 1, further comprising:
   a gate complex;
   the gate complex having the gate;
   wherein the gate complex is operably connected to the closed system;
   wherein the deployment chamber is configured to be attached to the gate complex.

4. The cleaning system of claim 1, further comprising:
   a gate complex;
      the gate complex having the gate;
      wherein the gate is configured to be selectively moved between an open position and a closed position;
   wherein the gate complex is operably connected to the closed system;
   wherein the gate complex is configured to allow selective access into the closed system when the gate is in the open position.

5. The cleaning system of claim 1, further comprising:
   wherein the gate is configured to be selectively moved between an open position and a closed position;
   wherein when the gate is moved to the open position, liquid from within the closed system flows into the deployment chamber;
   wherein when the interior volume of the deployment chamber is at least partially filled with liquid, the deployment chamber is configured to selectively deploy the cleaner into the closed system and onto the floor in order to clean the floor;
   wherein the deployment chamber is configured to selectively receive and contain the cleaner within the interior volume of the deployment chamber when the cleaner is no longer cleaning the floor;
   wherein when the cleaner is received and contained within the interior volume of the deployment chamber, the gate is moved to the closed position and liquid within the interior volume of the deployment chamber is drained.

6. The cleaning system of claim 1, further comprising:
   a transfer carriage;
      wherein the transfer carriage is configured to be housed within the interior volume of the deployment chamber;
      wherein the transfer carriage is configured to be removably attached to the cleaner;
   wherein the transfer carriage is configured to deploy the cleaner into the closed system.

7. The cleaning system of claim 1, further comprising:
   a transfer carriage;
      the transfer carriage having a carriage;
         wherein the carriage is configured to be removably attached to the cleaner;
         wherein the carriage is configured to facilitate horizontal movement of the cleaner;
      the transfer carriage having a winch;
         wherein the winch is configured to be attached to the cleaner;
         wherein the winch is configured to facilitate horizontal movement of the cleaner;
         wherein the winch is configured to facilitate vertical movement of the cleaner;
      wherein the winch and carriage of the transfer carriage facilitate horizontal movement of the cleaner such that the cleaner is deployed into the closed system.

8. A cleaning system for cleaning a floor of a closed liquid filled system having a volume, the system comprising:
   a gate complex;
      wherein the gate complex is connected to the closed system;
      wherein the gate complex is configured to allow selective access into the closed system;
   a cleaner;
   a first waste discharge line;
      the first waste discharge line attached to the cleaner;
   a box;

the box having at least one aperture;
the box having an interior volume;
the box configured to hold the cleaner within the interior volume of the box; wherein
the box is configured to be attached to the gate complex;
wherein the first waste discharge line is configured to extend through the at least one aperture of the box;
wherein the box is configured to selectively deploy the cleaner through the gate complex, into the closed system, and onto the floor in order to clean the floor; and
wherein waste removed from the floor by the cleaner is pumped through the first waste discharge line and through the box.

9. The cleaning system of claim 8, wherein the box is configured to be removably attached to the gate complex.

10. The cleaning system of claim 8, wherein the box includes a deployment chamber and a wash chamber.

11. The cleaning system of claim 8, further comprising:
the gate complex having a gate;
wherein the gate is configured to be selectively moved between an open position and a closed position;
wherein when the gate is in the open position, the gate complex allows access into the closed system.

12. The cleaning system of claim 8, further comprising:
the gate complex having a gate;
wherein the gate is configured to be selectively moved between an open position and a closed position;
wherein when the gate is moved to the open position, liquid from within the closed system flows into the box;
wherein when the interior volume of the box is at least partially filled with liquid, the box is configured to selectively deploy the cleaner into the closed system and onto the floor in order to clean the floor;
wherein the box is configured to selectively receive and contain the cleaner within the interior volume of the box when the cleaner is no longer cleaning the floor;
wherein when the cleaner is received and contained within the interior volume of the box, the gate is moved to the closed position and liquid within the interior volume of the box is drained.

13. The cleaning system of claim 8, further comprising:
a transfer carriage;
wherein the transfer carriage is configured to be housed within the interior volume of the box;
wherein the transfer carriage is configured to be removably attached to the cleaner;
wherein the transfer carriage is configured to deploy the cleaner into the closed system.

14. The cleaning system of claim 8, further comprising:
a transfer carriage;
the transfer carriage having a carriage;
wherein the carriage is configured to be removably attached to the cleaner;
wherein the carriage is configured to facilitate horizontal movement of the cleaner;
the transfer carriage having a winch;
wherein the winch is configured to be attached to the cleaner;
wherein the winch is configured to facilitate horizontal movement of the cleaner;
wherein the winch is configured to facilitate vertical movement of the cleaner;
wherein the winch and carriage of the transfer carriage facilitate horizontal movement of the cleaner such that the cleaner is deployed through the gate complex and into the closed system.

15. A cleaning system for cleaning a floor of a closed liquid filled system having a volume, the system comprising:
a gate;
wherein the gate is connected to the closed system;
wherein the gate is configured to be selectively moved between an open position and a closed position;
a cleaner;
a box;
the box having an interior volume;
the box configured to hold the cleaner within the interior volume of the box;
wherein the box is configured to attach to the gate;
wherein the box is configured to selectively receive and contain the cleaner within the interior volume of the box prior to cleaning the floor;
wherein when the gate is moved to the open position, liquid from within the closed liquid filled system flows into the interior volume of the box;
wherein when the interior volume of the box is at least partially filled with liquid, the box is configured to selectively deploy the cleaner into the closed system and onto the floor in order to clean the floor;
wherein the box is configured to selectively receive and contain the cleaner within the interior volume of the box after cleaning the floor;
wherein when the cleaner is received and contained within the interior volume of the box after cleaning the floor, the gate is moved to the closed position and liquid within the interior volume of the box is drained.

16. The cleaning system of claim 15, wherein the box is configured to be removably attached to the gate complex.

17. The cleaning system of claim 15, wherein the box includes a deployment chamber and a wash chamber.

18. The cleaning system of claim 15, further comprising:
a transfer carriage;
wherein the transfer carriage is configured to be housed within the interior volume of the box;
wherein the transfer carriage is configured to be removably attached to the cleaner;
wherein the transfer carriage is configured to deploy the cleaner into the closed system when the gate is in the open position.

19. The cleaning system of claim 15, further comprising:
a transfer carriage;
the transfer carriage having a carriage;
wherein the carriage is configured to be removably attached to the cleaner;
wherein the carriage is configured to facilitate horizontal movement of the cleaner;
the transfer carriage having a winch;
wherein the winch is configured to be attached to the cleaner;
wherein the winch is configured to facilitate horizontal movement of the cleaner;
wherein the winch is configured to facilitate vertical movement of the cleaner;
wherein when the gate is in the open position, the winch and carriage of the transfer carriage facilitate horizontal movement of the cleaner such that the cleaner is deployed through the gate and into the closed system.

\* \* \* \* \*